United States Patent [19]

Assenheim et al.

[11] Patent Number: 4,818,049
[45] Date of Patent: Apr. 4, 1989

[54] METHOD AND APPARATUS FOR EFFICIENTLY CONVEYING LIGHT OVER A DISTANCE AND EFFECTING CONTROLLED ILLUMINATION BY PROJECTION THEREOF

[75] Inventors: Harry M. Assenheim, Georgetown; Edwin W. Morley, Mississauga, both of Canada

[73] Assignee: Allied-Signal Inc., Morris Township, Morris County, N.J.

[21] Appl. No.: 61,051

[22] Filed: Jun. 10, 1987

[51] Int. Cl.$^4$ .............................................. G02B 6/26
[52] U.S. Cl. ............................. 350/96.15; 350/96.18; 350/96.20; 362/32
[58] Field of Search ............... 350/96.18, 96.15, 96.20, 350/96.21, 96.24; 372/6; 362/31, 32

[56] References Cited

U.S. PATENT DOCUMENTS

| | | | |
|---|---|---|---|
| 4,265,511 | 5/1981 | Nicia et al. | 350/96.18 |
| 4,290,667 | 9/1981 | Chown | 350/96.18 |
| 4,398,790 | 8/1983 | Righini et al. | 350/96.18 |
| 4,475,788 | 10/1984 | Tomassini et al. | 350/96.20 |
| 4,521,070 | 6/1985 | Sottini et al. | 350/96.15 |
| 4,529,264 | 7/1985 | Schmidt et al. | 350/96.20 |
| 4,531,810 | 7/1985 | Carlsen | 350/96.20 |
| 4,633,171 | 12/1986 | Storck et al. | 350/96.19 |
| 4,665,529 | 5/1987 | Baer et al. | 372/107 |
| 4,681,396 | 7/1987 | Jones | 350/96.18 |
| 4,720,163 | 1/1988 | Goodwin et al. | 350/96.20 |
| 4,723,257 | 2/1988 | Baer et al. | 372/108 |
| 4,732,450 | 3/1988 | Lee | 350/96.18 |
| 4,761,054 | 8/1988 | Ishimori et al. | 350/96.26 |

Primary Examiner—William L. Sikes
Assistant Examiner—Frank González
Attorney, Agent, or Firm—Terry L. Miller; James W. McFarland

[57] ABSTRACT

Method and apparatus for introducing laser light into one end of a fiber optic cable and extracting at the other end of the cable a laser beam which is apparently collimated and projectable over a certain distance.

23 Claims, 2 Drawing Sheets

METHOD AND APPARATUS FOR EFFICIENTLY CONVEYING LIGHT OVER A DISTANCE AND EFFECTING CONTROLLED ILLUMINATION BY PROJECTION THEREOF

BACKGROUND OF THE INVENTION

The field of the present invention involves use of optical fiber to convey light from a source thereof over a distance so as to achieve illumination of a surface therewith. Further, the present invention involves introduction of a coherent collimated laser beam into a first end of an optical fiber wherein multimodal propagation of the laser light occurs, and formation of laser light issuing from the opposite end of the optical fiber into an apparently collimated projectable beam. Because the apparently collimated beam is projectable with known characteristics, it may be advantageously employed to effect controlled illumination by projection over an additional known distance.

Use of optical fiber to convey laser light is known in the telecommunications technology. These known uses generally involve generation of a modulated laser light beam, for example, from a laser diode, and introduction of the modulated beam into an optical fiber. At the opposite end of the fiber the modulated light beam is directed upon a photo diode, or other photo-sensitive detector, for reconversion to an electrical signal. Because laser diodes and photo diodes are relatively large devices in comparison with the diameter of the optical fiber, common practice is to employ fibers having a rather large numerical aperture. The numerical aperture (hereinafter N.A.) of an optical fiber is the sine of one-half the divergence angle is air of light issuing from the outlet end of the optical fiber. Thus, use of optical fibers with a rather large N.A. is advantageous in telecommunications technology because they have both a large acceptance cone at their input end for receipt of light from a large laser diode, and produce a widely divergent (not collimated) beam for illumination of a photo diode at the opposite end of the fiber. A result of this coupling of optical fibers both with laser or photo diodes, and with other like optical fibers, has been the increasing acceptance of interface optics employing a full spherical lens, or a lens appearing optically as though it were full-spherical. However, the applications employing full-spherical or pseudo-spherical lenses as interface optics with an optical fiber do not anticipate projection over a substantial distance of a beam of light conveyed by the optical fiber.

The following U.S. Patents and other documents are believed to set forth teachings relating to use of optical fibers in telecommunications. These teachings were located by a pre-filing patentability search conducted on behalf of the Applicants, or are otherwise known to them at the time of filing.

| U.S. Pat. No. | Inventor | U.S. Pat. No. | Inventor |
|---|---|---|---|
| 3,656,832 | Judin | 4,329,017 | Kapany et al |
| 4,119,362 | Holzman | 4,380,365 | Gross |
| 4,183,618 | Rush et al | 4,420,219 | Muchel |
| 4,199,222 | Ikushima et al | 4,421,383 | Carlsen |
| 4,257,672 | Balliet | 4,483,585 | Takami |
| 4,273,109 | Enderby | 4,456,812 | Neiheisel et al |
| 4,290,667 | Chown | 4,531,810 | Carlsen |
| 4,327,963 | Khoe et al | 4,563,057 | Ludman et al |
| Great Britain Patent 2,120,400 | | | |
| German Patent DE 3224631 | | | |

| U.S. Pat. No. | Inventor | U.S. Pat. No. | Inventor |
|---|---|---|---|
| Publications: | L. G. Cohen, M. V. Schneider, "Microlenses for Coupling Junction Lasers to Optical Fibers", APPLIED OPTICS, Vol. 13, No. 1, January 1974, pp. 89–94. | | |
| | N. Nager, "Glass Sphere Lenses For Better Coupling", PHOTONICS SPECTRA, September 1983. | | |
| | D. E. Welsh, P. Popper, "Optical Contacts", Malco-South Pasadena, 306 Pasadena Avenue, South Pasadena, CA 91030. | | |

However, communication of laser light via optical fiber also has present or potential application in many fields including laser machining operations of various types, for example, welding, drilling and cutting; in laser catheters used for in vivo surgery; and in scanning laser light projections for producing visual effects and displays. In laser machining, for example, conventional practice requires the laser and workpiece to be precisely moved relative one another in order to apply the laser light directly from the laser to various locations on the workpiece. Fiber optic applications to laser machining are believed to employ a relatively stationary laser and workpiece with a projection head which is movable relative to the workpiece. The projection head is coupled with the laser via optical fiber to receive and project the laser light. However, heretofore, such fiber optic coupling and projection apparatus have suffered from low efficiency and poor quality of the projected laser beam.

Also, in the field of laser light projections for producing visual displays by scanning the laser light upon a surface, use of fiber optics to convey the laser light to a projection head having movable mirrors therein for scanning the beam has also encountered previously insurmountable difficulties. These difficulties are similar to those encountered in laser machining and include low transmission efficiency and poor quality of the projected beam.

Many of the above difficulties in use of optical fiber to convey light are known to originate with the light propagation characteristics of the optical fiber itself. That is, a laser beam issuing from a gas discharge laser, for example, is coherent and collimated. However, when this laser beam is condensed and introduced into an optical fiber, the beam issuing from the opposite end of the fiber is divergent rather than collimated. Additionally, the beam issuing from the fiber may be single mode if the fiber propagates only the transverse electromagnetic (0,0) ($TEM_{00}$) mode, or may appear with two or more modes. In the cases having two or more modes issuing from the fiber output end, projection of the beam through projection optics is particularly difficult because each mode is manifest as a different projected beam pattern. That is, the projected beam of one mode may be an annulus ($TEM_{01}$), while another mode produces a pair of spots side by side, for example. Of course, for the applications of interest, such as laser machining and laser optical displays, a beam projected over a substantial distance as a sharply-defined single spot is desired.

Another difficulty encountered when optical fiber is employed with a laser is in aligning the laser, a concentrating optic, and the fiber end so that the laser beam is properly introduced into the fiber core. Heretofore, such alignment required use of an optical bench and resulted in assemblies which were either frail and required frequent readjustment, or which were permanently united. Of course, when a permanently united assembly received some damage the entire unit most likely was unusable because no part thereof could be replaced. No conventional apparatus or method was available to provide interchangeable components which were both properly aligned optically, and truly interchangeable so that only a damaged or worn component of an entire assembly could be replaced.

SUMMARY OF THE INVENTION

In view of the above, it is a primary object of this invention to provide an optical fiber output optic which provides an apparently collimated output laser beam projectable over a known substantial distance.

An additional object for the present invention is to provide an optical fiber and output optic which in conjunction with one another provide a high efficiency transmission of laser light therethrough.

Yet another object of this invention is to provide apparatus and method for preserving proper alignment among related components of a system including a laser, an optical fiber cable, and a projection optic such that any one of the three components of the system may be interchanged with a like component while preserving proper system operation.

In furthermore of the above, the present invention provides an optical fiber output optic including a single lens abutting the output end of the optical fiber and providing an apparently collimated beam projected upon a surface located at a distance from the output optic and satisfying the following relations:

$$x \phi = 2Ld \text{ (N.A.)} \qquad \text{[Eq. 1]}$$

Where X and $\phi$ are, respectively, the diameter and divergence angle of the laser beam issuing from the output optic, L is the distance from the optic to the surface upon which the laser beam is projected, d and N.A. are the core diameter and numerical aperture of the optical fiber.

Further to the above, the present invention provides an optical system defining a minimal number of reflective surfaces, resulting in an improved efficiency of light transmission. Because the output optic comprises only a single lens, the interfaces between the optical fiber and output optic, and between the output optic and air are the only surfaces causing losses at the output end of the optical system. Losses at these surfaces may be advantageously minimized by the use of refractive index matching gel and anti-reflection coating of the lens output face.

Still further, the present invention provides an optical system including a laser, an optical fiber for conveying light from the laser, and an output optic receiving laser light via the optical fiber and providing an apparently collimated beam projectable upon a surface a known distance from the output optic wherein critical optical alignment relationships unique to each component of the system are preserved with that component, and interfaces between the components are arranged at locations in the optical system so as to result in truly interchangeable system components.

The invention further provides apparatus and method for first achieving and then permanently retaining critical optical alignment of an interface between individual lasers which differ in their output laser beam angularity and position and an optical fiber which is to receive and convey the laser beam.

Additional objects and advantages of the present invention will appear from a reading of the following description of a single preferred embodiment of the invention taken in conjunction with the drawing figures described below.

DETAILED DESCRIPTION OF THE PREFERRED EMBODIMENT OF THE INVENTION

Figure 1:
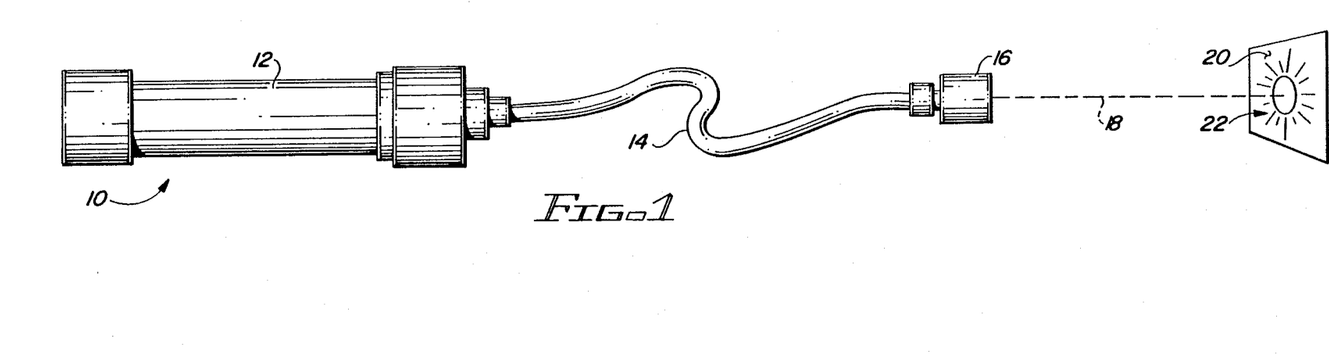
FIG. 1 schematically depicts an optical system embodying the present invention.

FIG. 1 shows an optical system 10 according to the invention, and including a laser tube 12, a fiber optic cable 14, and a projection optic housing 16. Laser light produced by the laser tube 12 is conveyed to the projection optic housing 16 and issues therefrom as an apparently collimated laser beam 18. The laser beam 18 is projected upon a target surface 20 which is disposed a distance "L" from the housing 16. In accord with the invention, the laser beam 18 is manifest upon target surface 20 as a single sharply-defined spot 22 of illumination. By way of example only, the target surface 20 may be defined by a work piece upon which laser machining, such as drilling, is to be performed. Alternatively, known beam scanning apparatus may be interposed downstream of housing 16 with respect to travel of beam 18, and be effective upon the latter to rapidly and controllably scan the spot 22 over the surface 20. Thus, the surface 20 may be employed as a viewing screen upon which a visual display is produced by the rapid and controlled scanning of spot 22.

However, it has been discovered that among otherwise identical laser tubes the laser beam issuing therefrom during operation will differ both in its angularity with respect to the axis of the laser tube and its position on X, Y axes transverse to the laser tube axis. On the other hand, the beam angle and position is constant for each laser tube throughout its service life. Such variation among serially manufactured laser tubes rules out the use of a standard coupling device which will interface directly with any one of such laser tubes and properly introduce the laser beam produced thereby into an optical fiber. In such respects then, the laser tubes even though they are serially manufactured and are otherwise identical, are not truly interchangeable components of an optical system. Each laser tube must conventionally be considered an individual case, and the associated optical system adjusted accordingly.

Figure 2:
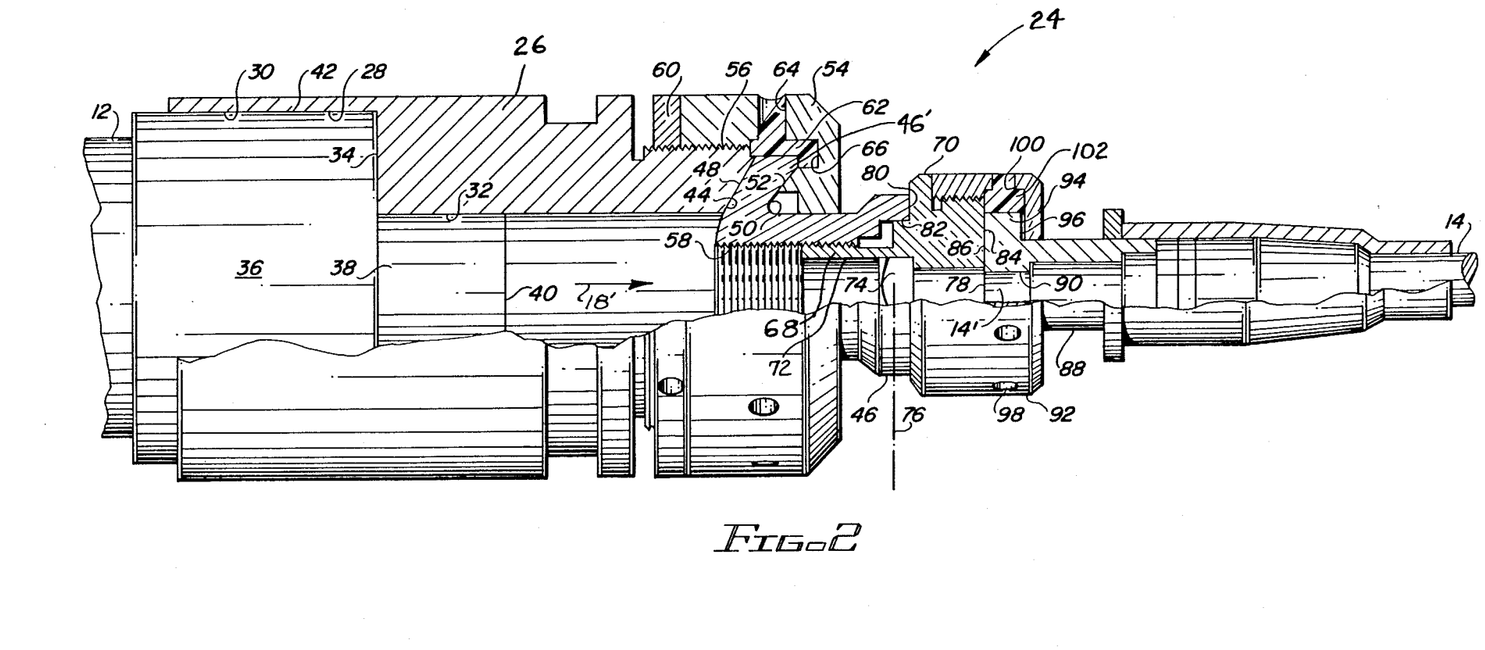
FIG. 2 depicts a fragmentary partially cross sectional view of an interface assembly connecting a laser tube with an optical fiber cable so that the laser beam produced by the tube is received into the optical fiber.

In order to obviate the problem created by variations among otherwise identical laser tubes as described above, the invention provides an interface assembly depicted in FIG. 2 and referenced generally with the numeral 24. The interface assembly 24 includes a base member 26 defining a stepped bore 28 therethrough. A large diameter portion 30 of bore 28 cooperates with a reduced diameter portion 32 thereof to define a shoulder 34. The laser tube 12 is received into bore 28 with a ballast resistor portion 36 thereof disposed in bore portion 30 and in engagement with shoulder 34. A laser rod portion 38 of laser tube 12 extends into bore portion 32 to dispose an exit mirror surface 40 thereof toward the other end of bore 28. Received in bore portion 30 between base member 26 and ballast resistor portion 36 is an adhesive potting compound 42 which permanently and immovably unites the laser tube 12 and base portion 26.

Because the ballast resistor portion 36 is closely received in bore portion 30 of base member 26, the axis of the latter will generally be coaxial with the axis of laser tube 12. However, during operation of laser tube 12 the laser beam (depicted by arrow 18′) issuing from exit mirror surface 40 may deviate angularly from the axis of laser tube 12 as well as being displaced from the geometric axis along transverse X, and Y axes. To compensate for the angular deviation of laser beam 18′, the base member 26 defines a part-spherical seat surface 44. A spherical coupler member 46 defines radially outwardly extending flange portion 46′ defining a matching part-spherical external surface 48 engaging surface 46. Spherical coupler 46 defines a part-spherical surface 50 which has a spherical center common with surfaces 44, 48 and which is engaged by part-spherical surface 52 of a nut member 54. The nut member 54 threadably engages base member 26 at a thread 56. The spherical coupler 46 defines a stepped and partially thread-defining through bore 58.

When the nut member 54 is slightly loose on thread 56, the spherical coupler 46 is movable by sliding engagement of the surfaces 44–48, and 50–52 to pivot the axis of through bore 58 into true parallelism with the axis of laser beam 18′. The way in which such parallelism is established will be further described hereinbelow. Once such parallelism is established, the nut member 54 is tightened on thread 56 to cinch the surfaces 44–48, 50–52 into slip-resistant frictional engagement. A lock ring 60 also threadably engages base member 26 on thread 56 and is engageable with nut member 54 to resist loosening thereof. Upon such intersecurement of spherical coupler 46 and base member 26 and verification of parallelism with the axis of beam 18′, an adhesive potting compound 62 is injected via a hole 64 into an annular cavity 66 defined within nut member 54, and which receives a radially outer peripheral part of flange portion 46′. Thus, the spherical coupler 46 is permanently and immovably secured in a fixed positional relation with laser tube 12 via base member 26. Therefore, the geometric axis of bore 58 in spherical coupler 46 is truly parallel with, but possibly spaced from, the axis of laser beam 18′.

Threadably coupling within bore 58 of spherical coupler 46 is a portion 68 of an X-Y coupler 70. The X-Y coupler 70 defines a stepped through bore 72 within which is immovably disposed a plano-convex condensing lens 74. Lens 74 defines an optical nodal plane which is referenced with dashed line 76. The nodal plane 76 of lens 74 lies at the spherical center of part-spherical surfaces 44, 48, 50 and 52. Lens 74 also defines a focal point 78 which is on the optical axis of lens 74, but which may be displaced from the axis of laser beam 18′. As is more fully explained herein below, the focal point 78 of lens 74 is precisely coincident with a transverse plane parallel with and spaced axially from the nodal plane 76.

X-Y coupler 70 and spherical coupler 46 define cooperable axially and radially extending reference interface surfaces 80,82 which insure that lens 74 is disposed in a known and repeatable position relative to laser tube 12 via base member 26, spherical coupler 46, and X-Y coupler 70. In order to further ensure that focal point 78 is coincident with an input end of an optical fiber to receive laser beam 18′ as concentrated by lens 74, the X-Y coupler 70 includes a pair of cooperable (and temporarily relatively movable) surfaces 84, 86. Surfaces 84, 86 lie precisely on a plane also containing the focal point 78. Surface 86 is defined by an optical cable termination member 88 defining a stepped through bore 90. Received within the bore 90 is the optical cable 14, an inner sheath portion 14′ of which extends to and defines a portion of the surface 86. The inner sheath portion 14′ is permanently and immovably secured in bore 90, and the end thereof is optically polished at surface 86 to position an input end (not shown) of the optical fiber therein (also not shown) precisely upon the plane of surfaces 84, 86.

It will be understood that the core of the optical fiber is only about 50μ ($\approx$0.002 inch) in diameter and must be positioned precisely coincident with the focal point 78. To this end, the X-Y coupler 70 includes a nut member 92 threadably engaging the remainder thereof, and capturing a radially extending flange portion 94 of termination member 88 between surface 84 and a wave spring 96. The wave spring 96 resiliently biases surfaces 84, 86 frictionally but movably into engagement. Nut member 92 defines a number of radially extending holes 98 opening to an annular cavity 100 radially outwardly of flange 94. As will be further described hereinafter, the termination member 88 is relatively moved transversely to place the optical fiber core precisely coincident with the focal point 78 in the sense of X-Y axes transverse to the optical axis of lens 74. Thereafter, an adhesive potting compound 102 is injected via holes 98 to fill cavity 100. Thus, the X-Y coupler 70 is permanently united with optical cable 14 with the lens 74 defining a focal point 78 coincident with the optical fiber core of the cable 14.

Figure 3:
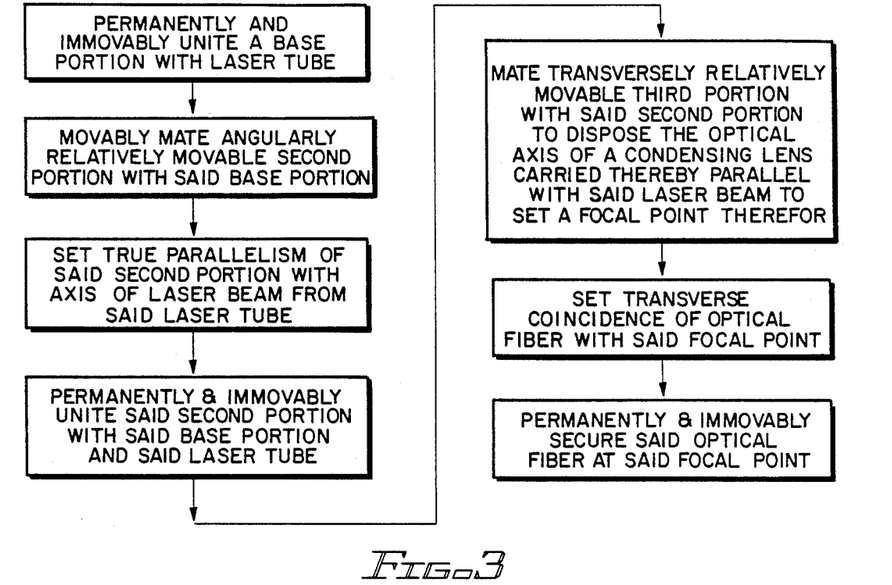
FIG. 3 presents a tabulation of steps in the method of achieving interchangeable component parts of the optical system according to the invention.

FIG. 3 presents in chronological order the steps in achieving angular alignment and X-Y alignment of the interface assembly 24. Reviewing the first four steps set out in FIG. 3 it will be seen that these four steps in combination establish an angular reference axis which is truly parallel with but possibly spaced from the axis of the laser beam. According to the preferred embodiment of the invention herein described, the reference axis so established is the geometric axis of the spherical coupler 46 and portion 68 of X-Y coupler 70. The fifth step of FIG. 3 results in the condensing lens 74 focusing the laser beam 18′, which may be received off-axis by lens 74, at a focal point 78 on the optical axis of the lens 74. The concluding two steps of FIG. 3 place and permanently secure the optical fiber in coincidence with focal point 78 to receive the concentrated laser beam.

After completing the first two steps of FIG. 3, the third step thereof may be achieved, for example, by employing a manufacturing fixture in conjunction with the spherical coupler 46. This fixture replicates portions 68 and 70 and X-Y coupler 70, but replaces the optical fiber end at the plane of surfaces 84,86 with a small aperture. When true parallelism of the axis of spherical coupler 46 is achieved by angular manipulation of the spherical coupler and fixture, the laser beam will be concentrated by lens 74 so as to exit through the small aperture of the fixture. Thereafter, the fourth step of FIG. 3 ensures that the laser tube so prepared is a truly interchangeable component of the optical system.

Similarly, steps 5–7 of FIG. 3 are achieved by using as a manufacturing fixture, or standard, a laser tube prepared as described above using the first four steps of FIG. 3. A laser tube so prepared is coupled with an X-Y coupler and optical fiber cable. Thereafter, pin members (not shown) are movably received through opposing holes 98 of nut member 92 and are employed to precisely manipulate the flange 94 to bring the $50\mu$ core (approx. 0.002 inch diameter) of the optical fiber into coincidence with the focal point 78. The inner ends of the pin members engage the radially outer surface of flange 94 while the outer ends of the pin members are engaged by conventional differential micrometers (also not shown) to manipulate the termination member 88 in the X-Y planes. Once coincidence of the focal point and fiber core is achieved, the adhesive potting compound 102 is injected while the X-Y alignment of member 88 is maintained by the differential micrometers. Step 7 when completed ensures that the fiber optic cable is a truly interchangeable component of the optical system. That is, any laser tube, and any optical fiber cable, prepared as above described may be coupled and will work properly together to introduce the laser beam into the optical fiber core of the cable.

Figure 4:
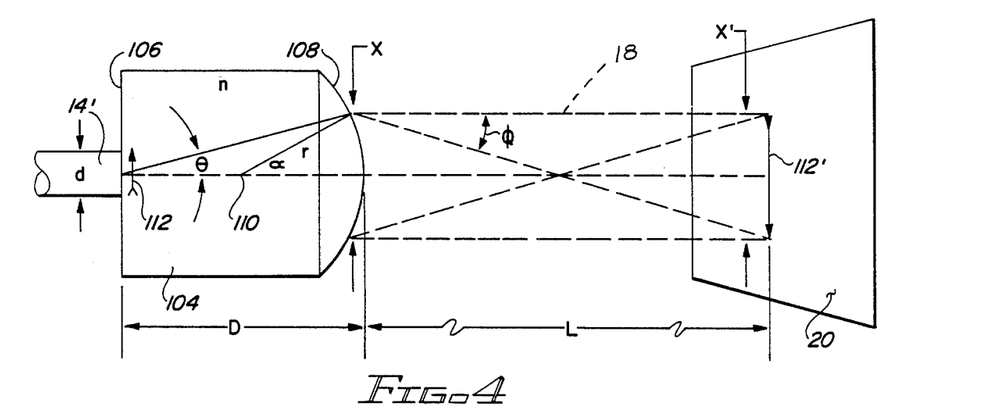
FIG. 4 somewhat schematically, and not to scale, depicts using geometric optics, the inventive relationship between the optical fiber core and output optic of the present invention resulting in an apparently collimated laser beam projected therefrom.

Turning now to FIG. 4 it will be seen that the present invention provides an output projection optic which is remarkably different from the conventional full-spherical lens many times employed in optical fiber systems. FIG. 4 presents the interrelationship among optical fiber core 14', projection optic 104, projected beam 18, and beam target 20 with illumination manifest thereon using geometric optics. Those skilled in the art will recognize that such a geometric representation is a gross simplification. However, FIG. 4 is useful for many purposes, including depiction of the spatial relationships of the physical component parts of the optical system. FIG. 4 also provides a geometric depiction of the optical phenomenon which is useful in understanding the essential parameters necessary to achieve apparent collimation of the projected laser beam. Recognizing that the laser beam exiting from an optical fiber will be divergent and that mode formation of the resulting beam is governed by the V-parameter while a single well-defined uniformerly illuminated spot 22 is desired, the possibility of obtaining a single lowest-order mode ($TEM_{00}$) beam from optical cable 14 is attractive. However, the V-parameter is:

$$V = dk(N_c^2 - N^2)^{\frac{1}{2}} = \frac{2\pi d}{\lambda} (N.A.)(\text{microns})$$

Where d is optical fiber core diameter $k=2\pi/\lambda$ with $\lambda$ being wavelength of propagated light (microns), $N_c$ and $N$, respectively, are refractive indices of the optical fiber core and cladding. The V-parameter must be less than 2.4 to ensure propagation only of the $TEM_{00}$ mode.

However for the wavelength of particular interest ($\lambda=0.63$ $\mu$), and for most other applicable laser light colors, it is clear that multimoding will always occur. Even with an optical fiber having the lowest practicable d and N.A. (approximately $4\mu$ and 0.11, respectively) for $\lambda=0.63$, multimoding will always occur. Accordingly, it is a feature of the present invention to utilize the tendency of optical fiber to generate multiple modes to achieve uniform illumination of the spot 22. This effect is achieved by deliberately selecting an optical fiber having a product of d (N.A.) considerably above the value given by $$\frac{1.2\lambda}{\pi} < d(N.A.) \qquad [\text{Eq. 2}]$$

According to the present preferred embodiment of the invention an optical fiber of $d=50\mu$, and N.A.$=0.13$ was selected. Thus, the V-parameter is approximately 65 and sufficient modes are formed so that mode-mixing insures apparently uniform illumination of spot 22.

Further to the above, it is apparent that a truly collimated beam 18 is not achievable despite the fact that laser beam 18' is truly collimated prior to introduction into fiber optic cable 14. Accordingly, the present invention provides an apparently collimated (not truly collimated) beam which upon projection across a known distance L produces an illuminated spot 22 substantially of the same size as the beam exiting the projection optic.

Returning attention to FIG. 4, it will be recalled that the invention provides an output projection optic for use in conjunction with an optical fiber so as to produce an apparently collimated output beam therefrom. The output optic is generally referenced with numeral 104.

Recalling that the optic 104 is to satisfy the relationship:

$$x \phi = 2Ld(N.A.) \qquad [\text{Eq. 1}]$$

Viewing FIG. 4, the optic 104 includes at one end an optically flat first surface 106, against which the core 14" of the optical fiber is abutted. At the opposite end, the optic 104 defines a part-spherical second surface 108 having a spherical center 110 on the axis of the optic. With an image presented at the fiber core and represented as an arrow 112, it may be seen that the image (arrow 112') will be projected over distance L upon a surface 20 at a size X substantially matching the size X of the light exiting optic 104. This projection of image size X matching projection size X at optic 104 proves apparent collimation of the projection beam. By inspection of FIG. 4 the following design relationships appear:

$$D = r\frac{n}{n-1} \text{ or } n = \frac{D}{D-r} \qquad [\text{Eq. 3}]$$

$$\alpha = \frac{x}{2r} \qquad [\text{Eq. 4}]$$

$$\theta = \frac{N.A.}{n} \qquad [\text{Eq. 5}]$$

$$\phi = \frac{d}{D-r} \qquad [\text{Eq. 6}]$$

$$x' = \frac{2Ld(N.A.)}{\phi} \qquad [\text{Eq. 7}]$$

Wherein D is the length of the projection optic 104 formed of material having a refractive index n. The symbols r and X, respectively, represent the spherical radius of surface 108 and the size of the beam as projected and as manifest upon surface 20 at a distance L from the optic 104. The angular values $\sigma$, $\phi$, and $\alpha$, respectively, are the divergence half-angle of the light exiting fiber core 14' in the material from which optic 104 is formed, the divergence angle of the beam as it exits optic 104, and the half-angle angle from the spherical center 110 to the outer limit of the projection beam as it leaves surface 108. The distance L for which an apparently collimated beam will be produced is easily derived from the above by recalling that for small angles, the sine thereof is equal to the angle expressed in radians, while the cosine is equal to 1. Therefore, $\phi = X/L$ [Eq. 8].

Because an optical fiber is chosen which propagates multiple modes, the spot 22 projected upon surface 20 is a magnified image of the core 14' of the optical fiber and appears uniformly illuminated and clearly defined. It will be noted that so long as Equation 1 is satisfied, the apparently collimated nature of the projection is independent of the refractive index n of the material of optic 104. Therefore, a material may be chosen which results in close matching of the optical fiber to the optic 104, and concomitant optimized light transmission efficiency.

OPERATIVE EXAMPLE

The Applicants have constructed a number of optical fiber-projection optic pairs which confirm the invention. By way of example, an optical fiber of 50μ core diameter with a N.A. of 0.13 was mated to a projection optic having n=1.515, r=6.86 mm, D=20.20 mm. The beam size at projection was 3.7 mm diameter and was manifest upon a surface one meter distant as a clearly defined uniform spot 3.8 mm diameter. Accordingly, the projected beam was apparently collimated and satisfactorily replicated, as projected, a laser beam without an intervening optical fiber conveyance. High transmission efficiency was demonstrated by a light power loss for the entire system of only 0.7 dB.

Figure 5:
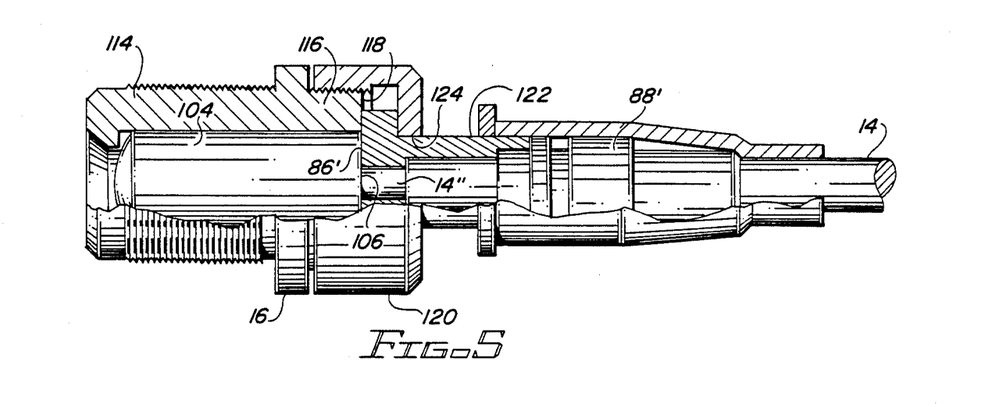
FIG. 5 is a fragmentary partially cross sectional view of output portion of the fiber optic cable, output optic, and housing therefor.

In conclusion, FIG. 5 illustrates a projection optic housing 16 which receives the optic 104 therein. The housing 16 defines a first external thread-defining portion 114 by which the housing and projection optic 104 may conveniently be mounted to other supporting and beam directing structure (not shown). The housing 16 also defines a second thread-defining portion 116 terminating at a surface 118 coplanar with the first surface 106 of optic 104. The optical cable 14 terminates in a termination member 88', like termination member 88, and similarly receiving a projecting sheath portion 14" of the cable 14. A planar end surface 86' is coplanar with the end of the optical fiber, and abuts the first surface 106 of optic 104. A nut member 120 removably threadably engages portion 116 of housing 16 to secure the surfaces 106 and 118 together. Cooperating surfaces 122, 124 of the termination member 88' and nut 120, respectively, ensure that the optical fiber abuts the surface 106 substantially coaxially with the optic 104. Accordingly, the cable 14 and optic 104 received in housing 16 are truly interchangeable components of an optical system. Provided that the optical fiber of the fiber optic cable 14 and the optic 104 which are united satisfy Equation 1 above, the optical system will continue to function as described despite replacement of component parts thereof.

Having described our invention with sufficient detail to enable one ordinarily skilled in the relevant art to make and use same, it is our desire to protect our invention as provided by applicable law in accord with the scope and spirit of the appended claims.

We claim:

1. The method of illuminating a selected area of a target surface with laser light comprising the steps of:
   obtaining laser light in the form of a truly collimated beam;
   introducing substantially all of said laser light into a first end of an elongate flexible fiber optic cable;
   transmitting said laser light from said first cable end internally thereof to a second end of said fiber optic cable with attendant formation of multiple modes therein;
   causing formation of a sufficient number of modes in said transmitted laser light to insure mode mixing and substantially uniform illumination of said selected area upon projection of said laser light;
   extracting from said second end of said fiber optic cable in multimodal form substantially all of said laser light introduced therein;
   projecting said extracted multimodal laser light in the form of an apparently collimated or not truly collimated beam having an initial diameter across a known certain distance of at least 100 initial diameters; and
   impinging said apparently collimated beam upon said target surface selected area to illuminate the latter.

2. The method of claim 1 including employing a fiber optic cable having a singular optical fiber therein which is significantly smaller in size than said collimated beam of laser light and having an acceptance angle, and condensing said collimated beam of laser light to a focal point via a convergence cone having an included angle within the acceptance angle of said optical fiber.

3. The method of claim 2 wherein said step of introducing said laser light into a first end of said fiber optic cable includes the further step of disposing a respective first end of said optical fiber precisely coincident with said focal point.

4. The method of claim 3 wherein said step of extracting from said second end of said fiber optic cable substantially all of said laser light introduced therein further comprises the step of disposing a respective second end of said optical fiber in substantially abutting relation with a first planar surface of a projection optic.

5. The method of illuminating a selected area of a target surface with laser light comprising the steps of:
   obtaining laser light in the form of a truly collimated beam;
   introducing substantially all of said laser light into a first end of an elongate flexible fiber optic cable;
   extracting from a second end of said fiber optic cable substantially all of said laser light introduced therein;
   projecting said extracted laser light across a known certain distance in the form of an apparently collimated beam;
   impinging said apparently collimated beam upon said target surface selected area to illuminate the latter;
   employing a fiber optic cable having a singular optical fiber therein which is significantly smaller in size than said collimated beam of laser light and having an acceptance angle, and condensing said collimated beam of laser light to a focal point via a convergence cone having an included angle within the acceptance angle of said optical fiber;

each step of introducing said laser light into a first end of said fiber optic cable includes the further step of disposing a respective first end of said optical fiber precisely coincident with said focal point;

said step of extracting from said second end of said fiber optic cable substantially all of said laser light introducing therein further comprises the step of disposing a respective second end of said optical fiber in substantially abutting relation with a first planar surface of a projection optic; and wherein said step of projecting said extracted laser light across a known certain distance in the form of an apparently collimated beam comprises the further step of configuring said projection optic as a thick plano-convex lens to satisfy the following conditions:

$$x\phi = 2Ld(N.A.)$$

$$D = r\frac{n}{n-1}$$

wherein x and $\phi$ are, respectively, the diameter and divergence angle of the projected beam, L is distance from said projection optic to target surface, D. and N.A. are the core diameter and numerical aperture of said optical fiber, respectively, n is the refractive index of the lens material, D is the length of the lens from planar first surface to a convex spherical second surface opposite thereof, and r is the spherical radius of said convex second surface.

6. The method of claim 5 wherein said step of impinging said apparently collimated beam upon said target surface comprises the additional steps of providing a target surface, disposing said target surface a distance L from said projection optic, and directing said apparently collimated beam upon said target surface to illuminate said selected area thereof.

7. Apparatus comprising:
a fiber optic cable including an optical fiber of core diameter d, and numerical aperture N.A.;
a thick plano-convex projection lens of refractive index N, length D, and spherical second surface radius r;
said optical fiber abutting a first planar surface of said lens and conveying laser light energy thereto;
wherein said optical fiber and projection lens in combination satisfy the relations:

$$x\phi = 2Ld(N.A.)$$

$$D = r\frac{n}{n-1}$$

x and $\phi$ being the diameter and divergence of light conveyed by said optical fiber to said projection lens as projected from the latter, L being a known distance from said spherical second surface to a target surface illuminated by laser light projecting therefrom.

8. The invention of claim 7 wherein said laser light energy has a wavelength $\lambda$, said optical fiber having a product of d(N.A.) significantly above the value given by:

$$\frac{1.2\lambda}{\pi}.$$

9. The invention of claim 8 wherein the product of d(N.A.) is at least twenty times the value of $1.2\lambda/\pi$.

10. The invention of claim 9 wherein the product of $$\frac{2\pi}{\lambda} \times d(N.A.)$$

is approximately sixty-five.

11. A method of conveying laser light energy via a fiber optic cable and effecting controlled illumination of a surface therewith by projection thereof over a known additional distance, said method comprising the steps of:

providing laser light energy of wavelength $\lambda$;
selecting a fiber optic cable having an optical fiber therein of diameter d, and numerical aperture N.A. such that the product of d(N.A.) is significantly above the value of $1.2\lambda/\pi$;
conveying said laser light energy via said optical fiber to an outlet end thereof;
substantially abutting said optical fiber outlet end with a first planar surface of a third plano-convex projection lens;
configuring said thick plano-convex projection lens to satisfy the relations:

$$x\phi = 2Ld(N.A.)$$

$$D = r\frac{n}{n-1}$$

wherein x and $\phi$ are the diameter and divergence angle of laser light projected from said projection lens, and L is a known certain distance from said projection lens to a target surface, D and r are the length and spherical second surface radius of said projection lens having refractive index n;
introducing laser light energy from said optical fiber into said projection lens;
projecting said laser light from said projection lens as an apparently collimated beam;
disposing a target surface a distance L from said projection lens; and
illuminating said target surface with said apparently collimated beam of projecting laser light energy.

12. A method of introducing a laser light beam produced by laser means into a fiber optic light cable comprising the steps of:

permanently and immovably uniting a base portion with said laser means;
movably mating an angularly relatively movable second portion with said base portion;
setting true parallelism of said second portion with the axis of said laser beam;
permanently and immovably uniting said parallel set second portion with said base portion and said laser tube;
mating with said parallel set second portion a transversely relatively movable third portion to dispose a condensing lens carried thereby parallel with said laser beam and setting a focal point for the latter;
setting transverse coincidence of said focal point with a first end of an optical fiber portion of said fiber optic light cable to introduce said laser light therein; and permanently and immovably securing said optical fiber at said focal point.

13. The method of claim 12 further comprising the method of extracting from said fiber optic light cable an apparently collimated laser beam projectable across a determined distance, and comprising the steps of:

employing as said optical fiber portion of said fiber optic light cable an optical fiber satisfying the relation:

$$d(N.A.) >> 1.2\lambda/\pi$$

wherein d is core diameter of the optical fiber having numerical aperture N.A., and $\lambda$ is the wave length of said laser light beam;

providing a thick plano-convex lens satisfying the following relations with said optical fiber:

$$x\phi = 2Ld(N.A.)$$

$$D = r\frac{n}{n-1}$$

where x and $\phi$ are the diameter and divergence of said apparently collimated laser beam, L is said determined distance, N the refractive index of the material of said lens, and r the spherical radius of the second surface of said lens having a length D from first planar surface to second spherical surface;

substantially abutting a second end of said optical fiber portion of said fiber optic light cable centrally with said first planar surface of said lens; and employing said abutted lens to receive laser light from said fiber optic light cable and produce therefrom an apparently collimated laser beam.

14. The method of claim 13 further including the steps of: providing a target surface spaced a distance L from said lens; projecting said apparently collimated laser beam from said lens across said distance L to said target, and employing said projected laser beam to controllably illuminate a selected area of said target surface.

15. In combination:

laser means producing a laser light beam of wave length $\lambda$;

fiber optic light cable means having an optical fiber portion thereof of core diameter d and numerical aperture N.A. where $d(N.A.) > 1.2\lambda/\pi$ for conveying said laser light;

means for introducing said laser light into a first end of said optical fiber portion;

projection optic means for receiving from a second end of said optical fiber portion said laser light and for projection thereof as an apparently collimated laser beam, said projection optic means including a lens satisfying the relation:

$$x\phi = 2Ld\ (N.A.)$$

where x and $\phi$ are the diameter and divergence angle of said apparently collimated laser beam, and L is a determined distance across which said apparently collimated beam is to be projected.

16. The invention of claim 15 further including said lens being of thick plano-convex type satisfying the additional relation:

$$D = r\frac{n}{n-1}$$

where n is the refractive index of the lens material, D is the lens length, and r is the spherical radius of a second surface of said lens.

17. The invention of claim 15 wherein said means for introducing said laser light into said optical fiber portion comprises base means permanently and immovably coupling with said laser means, a relatively angularly movable portion having an axis and coupling with said base portion with said axis in true parallelism with the axis of said laser beam, means for permanently and immovably uniting said base portion and said truly parallel second portion, a third portion removably coupling with said second portion and carrying a condensing lens having its nodal plane perpendicular with said laser beam axis, said condensing lens receiving said laser beam to set a focal point therefor, said third portion including a transversely relatively movable part carrying said fiber optic light cable and disposing said optical fiber portion first end in a plane coincident with said focal point and parallel with said nodal plane, said optical fiber portion first end and said focal point being coincident, means for permanently and immovably uniting said third portion and said transversely relatively movable part thereof.

18. The invention of claim 15 further including means for substantially abutting a second end of said optical fiber portion with a first planar surface of said projection optic lens, said abutting means comprising a housing defining a termination surface coplanar with said projection optic lens first planar surface, said fiber optic light cable including a termination member having a planar surface coplanar with said optical fiber portion second end, and means for removably securing said lens first planar surface and said housing termination surface in engagement with said termination member planar surface with said optical fiber portion second end substantially concentric with said lens.

19. Apparatus for conveying laser light from a source thereof via an elongate flexible fiber optic light cable and providing an apparently collimated laser light beam projecting across an additional certain distance, said apparatus comprising:

a laser light source having a light-aperture surface through which issues a truly collimated beam of laser light having a wavelength $\lambda$, said laser light source being unique among otherwise substantially similar light sources in that said laser beam issues from said aperture surface with an individual axial angulation and transverse off-axis position with respect to external geometric features of said light source;

a base member permanently and immovably intersecuring with said laser light source, said base member defining a first through passage for conveying said laser beam, and defining a part-spherical concave seating surface circumscribing said passage and having a respective spherical center;

a relatively angularly movable second portion defining a second passage communicating with said first passage for conveying said laser beam, and a respective convex part-spherical engagement surface circumscribing said second passage and slidably engaging said seating surface and having a respective spherical center coincident with said first spherical center, said second portion defining a respective axis and having a relative position of true parallelism of said axis with said laser beam;

a third portion removably intersecuring with said second portion and defining a respective passage communicating with said first and said second passages for conveying said laser beam, said second portion and said third portion defining cooperating precision surfaces for precise position-repeatable reengagement thereof, said third portion defining a respective axis truly parallel with said second axis;

a condensing lens disposed in said third passage and defining a nodal plane coincident with said spherical center and perpendicular to said laser beam axis, said condensing lens receiving said laser beam truly perpendicularly to said nodal plane and possibly off-axis dependent upon transverse off-axis position of said laser beam issuing from said aperture surface and concentrating said laser light to a focal point on the optical axis of said condensing lens;

said third portion including a transversely relatively movable part carrying a termination end portion of said fiber optic light cable, said third portion and said transversely relatively movable art defining respective sliding engagement planar surfaces coincident with said focal point and parallel with said nodal plane; in a focal-point-coincident relative position of said part, a first end surface portion of said fiber optic light cable being coincident with said focal point at said planar surface of said relatively movable part to receive said laser light concentrated thereat by said condensing lens;

means for permanently and immovably intersecuring both said base portion with said second portion in said relative position of true parallelism, and said third portion with said part thereof in said focal-point-coincident relative position;

said fiber optic light cable including an elongate optical fiber portion having a core of diameter d and numerical aperture N.A. and defining a first end surface part and a second end surface part at opposite ends of said cable, said first end surface part being disposed at said focal point to receive said concentrated laser light; said core satisfying the relation $d(N.A.) > 1.2\lambda/\pi$ to ensure internal multimodal transmission of laser light between said end surface parts thereof;

a thick lens plano-convex projection optic operatively associated with said second end surface part of said optical fiber portion to receive transmitted multimodal laser light therefrom, said projection optic thick plano-convex lens satisfying the relations:

$$x\phi = 2Ld(N.A.)$$

$$D = r\frac{n}{n-1}$$

where x and $\phi$ are, respectively, the diameter and angular divergence of said apparently collimated laser beam as projected by said optic, D is the length of said plano-convex thick lens having a second surface of spherical radius r, and of transparent material with refractive index n, said apparently collimated beam projecting from said optic across an additional certain distance L to produce controlled multimodal illumination of a spot having substantially x diameter.

20. The invention of claim 19 further including means for disposing said second end surface of said optical fiber portion in central abutting relation with a first planar surface of said plano-convex lens.

21. The invention of claim 19 wherein the value d is substantially 50 micron and N.A. is substantially 0.13, with $\lambda$ being substantially 0.63 micron.

22. The invention of claim 21 wherein the values of n, r, and D are, respectively, substantially 1.515, 6.86 mm, and 20.2 mm.

23. The invention of claim 22 wherein the value of x is substantially 3.7 mm, and L has a value of 1 meter.

* * * * *